US 11,441,496 B2

(12) United States Patent
Hill et al.

(10) Patent No.: US 11,441,496 B2
(45) Date of Patent: Sep. 13, 2022

(54) FUEL CONSUMPTION CALCULATION OF A FUEL AND WATER MIXTURE

(71) Applicant: MICRO MOTION, INC., Boulder, CO (US)

(72) Inventors: Christopher Douglas Hill, Ponte Vedra Beach, FL (US); Patrick John Zimmer, Denver, CO (US); Taylor Robert Scott, Boulder, CO (US)

(73) Assignee: MICRO MOTION, INC., Boulder, CO (US)

(*) Notice: Subject to any disclaimer, the term of this patent is extended or adjusted under 35 U.S.C. 154(b) by 451 days.

(21) Appl. No.: 16/303,046

(22) PCT Filed: Jun. 6, 2017

(86) PCT No.: PCT/US2017/036058
§ 371 (c)(1),
(2) Date: Nov. 19, 2018

(87) PCT Pub. No.: WO2017/214082
PCT Pub. Date: Dec. 14, 2017

(65) Prior Publication Data
US 2019/0301374 A1 Oct. 3, 2019

Related U.S. Application Data

(60) Provisional application No. 62/347,999, filed on Jun. 9, 2016.

(51) Int. Cl.
*F02D 19/08* (2006.01)
*G01F 1/74* (2006.01)
(Continued)

(52) U.S. Cl.
CPC ......... *F02D 19/088* (2013.01); *F02M 25/025* (2013.01); *F02M 25/0225* (2013.01);
(Continued)

(58) Field of Classification Search
CPC .......... F02D 19/088; F02M 25/025; F02M 25/0225; G01F 1/84; G01F 1/74;
(Continued)

(56) References Cited

U.S. PATENT DOCUMENTS

| 6,612,186 B1 | 9/2003 | Patten et al. |
| 8,813,690 B2 | 8/2014 | Kumar et al. |
| 2011/0265773 A1 | 11/2011 | Xu et al. |

FOREIGN PATENT DOCUMENTS

| EP | 2333276 A1 * | 6/2011 | ............. F02D 19/12 |
| EP | 2602547 A1 | 6/2013 | |

(Continued)

OTHER PUBLICATIONS

MAN Diesel & Turbo: "Calculation of specific fuel oil consumption (SFOC)", May 3, 2017 (May 3, 2017), XP055655539, Retrieved from the Internet: URL:https://powerplants.man-es.com/applications/projectguides/4stroke/content/B11010_3700405-6.pdf [retrieved on Jan. 8, 2020].

(Continued)

*Primary Examiner* — Leslie J Evanisko
*Assistant Examiner* — Leo T Hinze
(74) *Attorney, Agent, or Firm* — The Ollila Law Group LLC (57) ABSTRACT

A fuel control system (300) for fuel consumption calculation for a fuel and water mixture is provided. The fuel control system (300) includes a mixer (330), a fuel source (310) fluidly coupled to the mixer (330), the fuel source (310) being configured to measure a flow of fuel to the mixer (330), a water source (315) fluidly coupled to the mixer (330), the water source (315) being configured to measure a flow of water to the mixer (330), and a mixture flow meter (5) fluidly coupled to the mixer (330). The mixture flow (Continued)

meter (5) is configured to receive and measure properties of a fuel/water mixture from the mixer (330).

13 Claims, 4 Drawing Sheets

(51) Int. Cl.
   *G01F 1/86* (2006.01)
   *F02M 25/025* (2006.01)
   *F02M 25/022* (2006.01)
   *G01F 1/84* (2006.01)
   *B63H 21/38* (2006.01)

(52) U.S. Cl.
   CPC .................. *G01F 1/74* (2013.01); *G01F 1/84* (2013.01); *G01F 1/86* (2013.01); *B63H 21/38* (2013.01); *Y02T 10/12* (2013.01)

(58) Field of Classification Search
   CPC ........... G01F 1/86; Y02T 10/12; B63H 21/38; B63G 8/12
   See application file for complete search history.

(56) References Cited

FOREIGN PATENT DOCUMENTS

| KR | 101110015 B1 | 4/2012 |
|---|---|---|
| KR | 101463972 B1 | 11/2014 |
| WO | 2010112195 A2 | 10/2010 |
| WO | 2015030187 A1 | 3/2015 |

OTHER PUBLICATIONS

Hans Otto Kristenen: "Energy demand and exhaust gas emissions of marine engines", The Technical University of Denmark, Sep. 1, 2015 (Sep. 1, 2015), XP055655630.

Giannoutsos Spyridon V et al.: "Development of an integrated energy efficiency control system for ship power balance and diesel generator fuel consumption optimization", 2013 IEEE Industry Applications Society Annual Meeting, IEEE, Oct. 6, 2013 (Oct. 6, 2013), pp. 1-11, XP032529092, ISSN: 0197-2618, DOI: 10.1109/IAS.2013.6682477 [retrieved on Dec. 11, 2013].

Choi Byung Chul et al.: "Thermodynamic analysis of a dual loop heat recovery system with trilateral cycle applied to exhaust gases of internal combustion engine or propulsion of the 6800 TEU container ship", Energy, Elsevier, Amsterdam, NL, vol. 58, Jun. 28, 2013 (Jun. 28, 2013), pp. 404-416, XP028685448, ISSN: 0360-5442, DOI: 10.1016/J.ENERGY.2013.05.017.

Moreno-Gutiérrez Juan et al.: "Methodologies for estimating shipping emissions and energy consumption: A comparative analysis of current methods", Energy, Elsevier, Amsterdam, NL, vol. 86, May 28, 2015 (May 28, 2015), pp. 603-616, XP029225451, ISSN: 0360-5442, DOI: 10.1016/J.ENERGY.2015.04.083.

* cited by examiner

FUEL CONSUMPTION CALCULATION OF A FUEL AND WATER MIXTURE

TECHNICAL FIELD

The embodiments described below relate to fuel consumption calculation and, more particularly, to a fuel consumption calculation of a fuel and water mixture.

BACKGROUND

The marine industry uses heavy fuel oils for engines on ships. The amount of water in a fuel line supplying fuel to the engine may be small relative to the amount of heavy fuel oil. This small concentration of water vaporizes after the larger concentration of the heavy fuel oil. Because water is less expensive than heavy fuel oil, burning the water improves the efficiency of the engine. However, many standards are based on the consumption of fuel without the water.

For example, the Specific Fuel Oil Consumption (SFOC) value is the fuel efficiency of a marine engine. An engine's SFOC can be calculated to an ISO standard (ISO 3046-1) and compared to its Factory Acceptance Test SFOC in order to determine the current lifecycle usage of the engine. This ISO standard comparison can also be used to prove the effectiveness of preventative maintenance/service programs sold by the engine manufacturer, as the typical lifespan of an engine is over 10 years. Below are a few examples of measurement data that can be used to correct an engine's SFOC to an ISO standard:

Ambient temperature
Ambient humidity
Fuel calorific content

When water is mixed with fuel, the calorific content of the burned mixture is different than the calorific content of pure fuel. If this effect on calorific content is not accounted for, a customer could interpret false SFOC data and therefore falsely evaluate the efficiency increase/decrease of an engine maintenance service. Accordingly, there is a need for fuel consumption calculation of a fuel and water mixture.

SUMMARY

A fuel control system for fuel consumption calculation for a fuel and water mixture comprising a mixer is provided. According to an embodiment, the fuel control system comprises a fuel source fluidly coupled to the mixer, the fuel source being configured to measure a flow of fuel to the mixer, a water source fluidly coupled to the mixer, the water source being configured to measure a flow of water to the mixer, and a mixture flow meter fluidly coupled to the mixer, the mixture flow meter being configured to receive and measure properties of a fuel/water mixture from the mixer.

A method of calculating a fuel consumption of a fuel and water mixture is provided. According to an embodiment, the method comprises flowing a fuel/water mixture, measuring a flow of the fuel and the water in the fuel/water mixture, and calculating a fuel consumption based on the measured flow of the fuel and the water.

Aspects

According to an aspect, a fuel control system (300) for fuel consumption calculation for a fuel and water mixture comprises a mixer (330), a fuel source (310) fluidly coupled to the mixer (330), the fuel source (310) being configured to measure a flow of fuel to the mixer (330), a water source (315) fluidly coupled to the mixer (330), the water source (315) being configured to measure a flow of water to the mixer (330), and a mixture flow meter (5) fluidly coupled to the mixer (330), the mixture flow meter (5) being configured to receive and measure properties of a fuel/water mixture from the mixer (330).

Preferably, the fuel control system (300) further comprises a controller (360) communicatively coupled to the fuel source (310), the water source (315), and the mixture flow meter (5), said controller (360) being configured to calculate a fuel consumption based on the measured flow of the fuel and the measured flow of the water.

Preferably, the controller (360) being configured to calculate the fuel consumption based on the measured flow of the fuel and the measured flow of the water comprises the controller (360) being configured to calculate the fuel consumption based on the equation:

$$SFOC = \left[\frac{\alpha}{K} * Be * \frac{Q_{TEST}}{Q_{CONT}}\right] - EDP,$$

where:
SFOC=specific fuel oil consumption (g/kWh);
$Q_{TEST}$=net calorific value of the fuel oil during test (MJ/kg);
$Q_{CONT}$=net calorific value of the fuel oil during the engine's baseline characterization (MJ/kg), which may be referred to as factory acceptance test;
α=power adjustment factor;
K=ratio of indicated power;
Be=fuel oil consumption on test bed (g/kWh); and
EDP=Engine driven pumps (g/kWh).

Preferably, the net calorific content of the fuel during test ($Q_{TEST}$) is updated using the following equation:

$$Q_{NEW} = (Q_{FUEL} * m_{FUEL})(Q_{WATER} * m_{WATER});$$

where:
$Q_{NEW}$=calorific content of the fuel/water mixture;
$Q_{FUEL}$=calorific content value of fuel oil;
$Q_{WATER}$=calorific content value of water;
$m_{FUEL}$=mass flow concentration factor of fuel; and
$m_{WATER}$=mass flow concentration factor of water.

Preferably, the controller (360) being configured to calculate a fuel consumption based on the measured flow of the fuel and the water comprises the controller (360) being configured to calculate a mass flow concentration factor of the fuel ($m_{FUEL}$) and a mass flow concentration factor of the water ($m_{WATER}$) based on the measured flow of the fuel, the measured flow of the water, and a measured flow of the fuel/water mixture provided by the mixture flow meter (5).

Preferably, the water source (315) comprises a water source flow meter (5w) and the fuel source (310) comprises a fuel source flow meter (5f).

Preferably, the water source (315) being configured to measure the flow of water comprises the water source (315) being configured to measure a mass flow of the water ($m_{FLOW\ WATER}$) and the fuel source (310) being configured to measure the flow of the fuel comprises the fuel source (310) being configured to measure a mass flow of fuel ($m_{FLOW\ FUEL}$).

Preferably, the mixture flow meter (5) being configured to receive and measure properties of a fuel/water mixture from the mixer (330) comprises the mixture flow meter (5) being configured to measure a mass flow of the fuel/water mixture ($m_{FLOW\ TOTAL}$).

Preferably, the measured flow of the fuel and the measured flow of the water are volume flow rates, and wherein the fuel source (310) is further configured to measure a density of the flow of the fuel, the water source (315) is further configured to measure a density of the flow of the water, and the properties of the fuel/water mixture comprise at least one of a volume flow rate and a density of the fuel/water mixture.

According to an aspect, a method of calculating a fuel consumption of a fuel and water mixture comprises flowing a fuel/water mixture, measuring a flow of the fuel and the water in the fuel/water mixture, and calculating a fuel consumption based on the measured flow of the fuel and the water.

Preferably, calculating the fuel consumption based on the measured flow of the fuel and the water comprises calculating the fuel consumption based on the equation:

$$SFOC = \left[\frac{\alpha}{K} * Be * \frac{Q_{TEST}}{Q_{CONT}}\right] - EDP,$$

where:
- SFOC=specific fuel oil consumption (g/kWh);
- $Q_{TEST}$=net calorific value of the fuel oil during test (MJ/kg);
- $Q_{CONT}$=net calorific value of the fuel oil during the engine's baseline characterization (MJ/kg), which may be referred to as factory acceptance test;
- α=power adjustment factor;
- K=ratio of indicated power;
- Be=fuel oil consumption on test bed (g/kWh); and
- EDP=Engine driven pumps (g/kWh).

Preferably, the net calorific content of the fuel during test ($Q_{TEST}$) is updated using the following equation:

$$Q_{NEW} = (Q_{FUEL} * m_{FUEL})(Q_{WATER} * m_{WATER});$$

where:
- $Q_{NEW}$=calorific content of the fuel/water mixture;
- $Q_{FUEL}$=calorific content value of fuel oil;
- $Q_{WATER}$=calorific content value of water;
- $m_{FUEL}$=mass flow concentration factor of fuel; and
- $m_{WATER}$=mass flow concentration factor of water.

Preferably, calculating a fuel consumption based on the measured flow of the fuel and the water comprises calculating a mass flow concentration factor of the fuel ($m_{FUEL}$) and a mass flow concentration factor of the water ($m_{WATER}$) based on the measured flow of the fuel and the water, and a measured flow of the fuel/water mixture.

Preferably, measuring the flow of the fuel and the water comprises measuring a mass flow of the water ($m_{FLOW\ WATER}$) and measuring a mass flow of fuel ($m_{FLOW\ FUEL}$).

Preferably, measuring the flow rate of the fuel and the water comprises measuring a mass flow of the fuel/water mixture ($m_{FLOW\ TOTAL}$).

Preferably, the measured flow of the fuel and the measured flow of the water are volume flow rates, and wherein the method further comprises measuring a density of at least one of the flow of the fuel and the flow of the water.

BRIEF DESCRIPTION OF THE DRAWINGS

The same reference number represents the same element on all drawings. It should be understood that the drawings are not necessarily to scale.

DETAILED DESCRIPTION

FIGS. 1-4 and the following description depict specific examples to teach those skilled in the art how to make and use the best mode of embodiments of a fuel consumption calculation of a fuel and water mixture. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the fuel consumption calculation of the fuel and water mixture. As a result, the embodiments described below are not limited to the specific examples described below.

Fuel Control System

Figure 1:
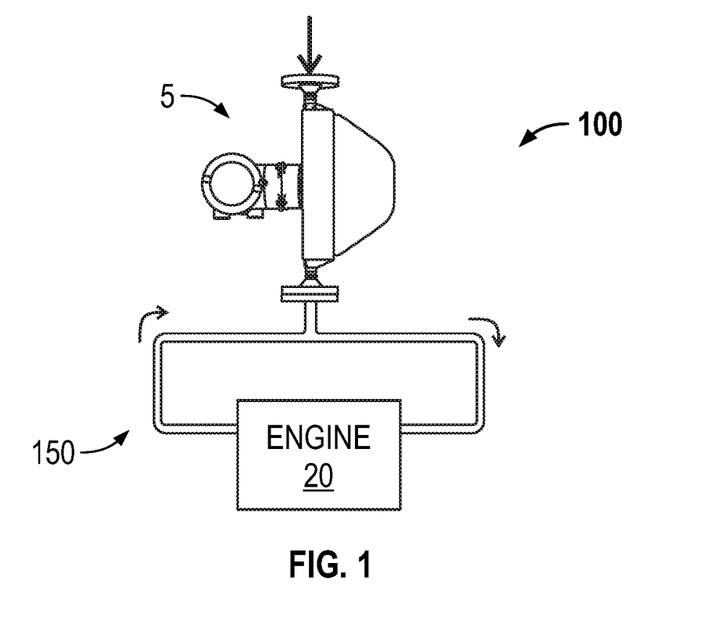
FIG. 1 shows a fuel control system 100 for fuel consumption calculation of a fuel and water mixture.

FIG. 1 shows a fuel control system 100 for a fuel consumption calculation for a water and fuel mixture. As shown in FIG. 1, the fuel control system 100 is comprised of a mixture flow meter 5 fluidly coupled to an engine 20. Also shown is a re-circulator 150, which is comprised of a fuel line conveying unconsumed fuel provided by the engine 20. The re-circulator 150 re-circulates the unconsumed fuel back to the engine 20 to be consumed. The mixture flow meter 5 is fluidly coupled to the engine 20 via the re-circulator 150.

As shown in FIG. 1, the mixture flow meter 5 may be a vibratory flow meter, such as a Coriolis flow meter, although any suitable flow meter may be employed in alternative embodiments. The mixture flow meter 5 may be configured to measure and/or determine properties and characteristics of the fuel flowing through the mixture flow meter 5. For example, the mixture flow meter 5 may measure a flow of the fuel/water mixture flowing through the mixture flow meter 5.

Although the mixture flow meter 5 is shown as a single integrated unit, the mixture flow meter 5 may be comprised of separate components distributed throughout the fuel control system 100. For example, a meter electronics in the mixture flow meter 5 may be part of a separate controller that is communicatively coupled to, for example, the engine 20. Additionally or alternatively, the mixture flow meter 5 may be comprised of separate components that perform specific functions, such as a first component that measures the density of the fuel, a second component that measures the flow rate, etc. The mixture flow meter 5 may also be disposed at different locations in the fuel control system 100. For example, the mixture flow meter 5 may be disposed closer to the engine 20, be part of the re-circulator 150, etc.

As shown in FIG. 1, the mixture flow meter 5 receives the fuel/water mixture and provides the fuel/water mixture to the re-circulator 150. The fuel/water mixture provided by the mixture flow meter 5 is mixed with the unconsumed fuel/water mixture provided by the engine 20. As can be appreciated, the mixture flow meter 5 provides the fuel/water mixture to the re-circulator 150 at a rate that is the same as a rate of consumption by the engine 20. As can also be appreciated, FIG. 1 shows a serial configuration. That is, only one mixture flow meter 5 is employed to provide the fuel/water mixture to the engine 20. In addition, the rate of consumption by the engine 20 is determined from the mixture flow meter 5. Other configurations may be employed, as the following discussion illustrates.

Figure 2:
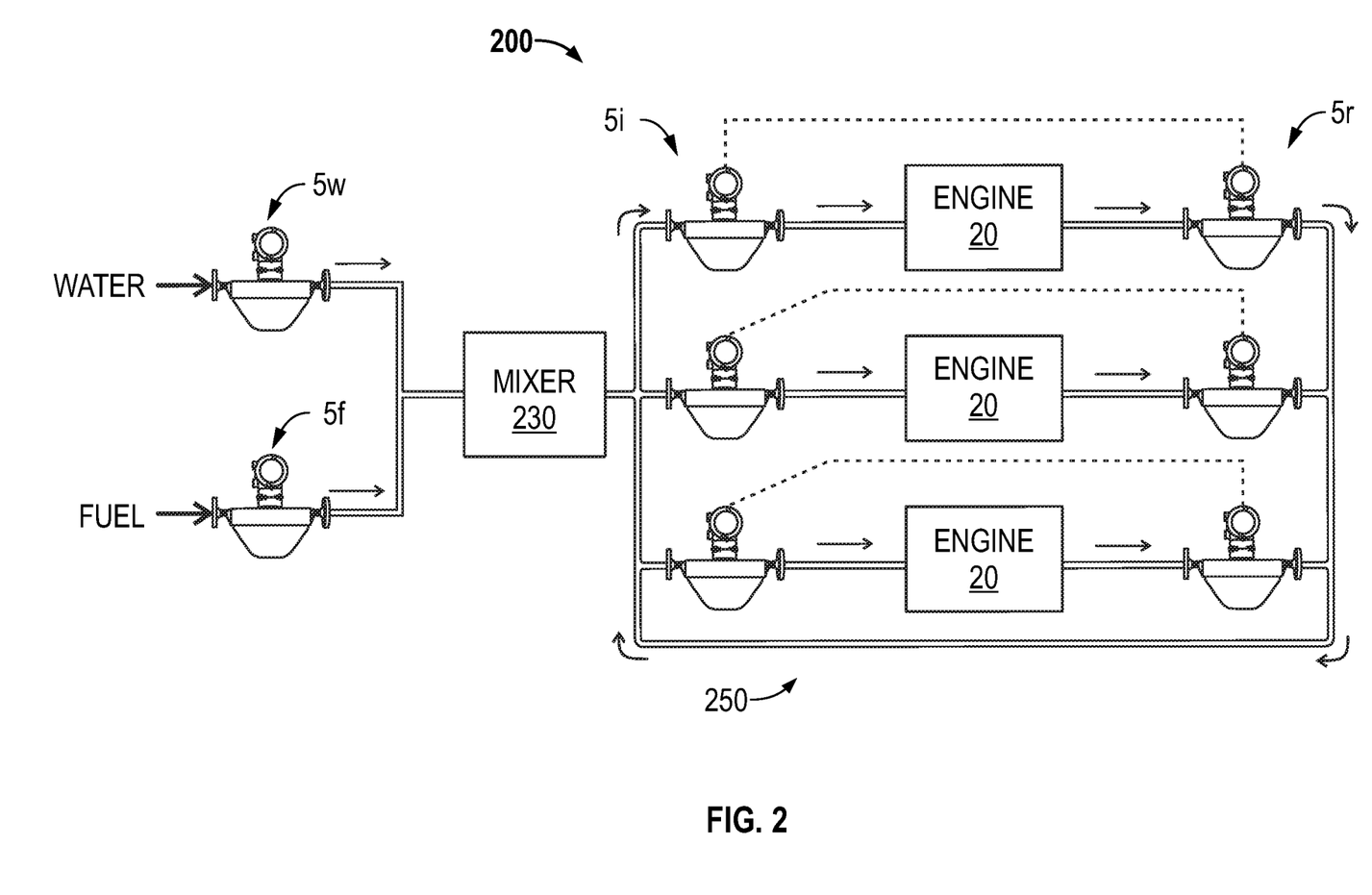
FIG. 2 shows another fuel control system 200 for fuel consumption calculation of a fuel and water mixture.

FIG. 2 shows another fuel control system 200 for a fuel consumption calculation for a fuel and water mixture. As shown in FIG. 2, the fuel control system 200 is comprised of inlet flow meters 5$i$ fluidly coupled to engines 20. The return flow meters 5$r$ are also fluidly coupled to the engines 20. Also shown is a re-circulator 250, which is comprised of a fuel line re-circulating unconsumed fuel/water mixture provided by the engine 20. The re-circulator 250 conveys the re-circulated fuel/water mixture back to the engine 20 to be consumed. The inlet flow meters 5$i$ are fluidly coupled to the engine 20 and the return flow meters 5$r$ are fluidly coupled to inlet flow meters 5$i$ via the re-circulator 250. The inlet and return flow meters 5$i$, 5$r$ may be the same as the mixture flow meter 5 described with reference to FIG. 1. Also shown is a water source flow meter 5$w$ and a fuel source flow meter 5$f$, which are fluidly coupled to a mixer 230. The mixer 230 is fluidly coupled to the inlet and return flow meters 5$i$, 5$r$.

The water source flow meter 5$w$ and the fuel source flow meter 5$f$ respectively provide water and fuel to the mixer 230. The water source flow meter 5$w$ and the fuel source flow meter 5$f$ measure a flow of the water and fuel provided to the mixer 230. The measured flow may be any suitable flow, such as a volume or mass flow rate. The mixer 230 mixes the fuel and water into a fuel/water mixture and provides the fuel/water mixture to the inlet flow meters 5$i$.

The inlet flow meters 5$i$ receive a fuel/water mixture from the mixer 230 and provide the fuel/water mixture to the engines 20. The fuel/water mixture provided by the inlet flow meters 5$i$ is mixed with the unconsumed fuel/water mixture provided by the engines 20. As can be appreciated, the inlet flow meters 5$i$ provide the re-mixed fuel/water mixture to the engines 20 at a rate that may be similar to a rate of consumption by the engines 20. The rate of consumption by the engines 20 may also be similar to the difference in flow rates measured by the inlet flow meters 5$i$ and the return flow meters 5$r$. As can also be appreciated, FIG. 2 shows a parallel configuration of the inlet flow meters 5$i$, engines 20, and return flow meters 5$r$.

Figure 3:
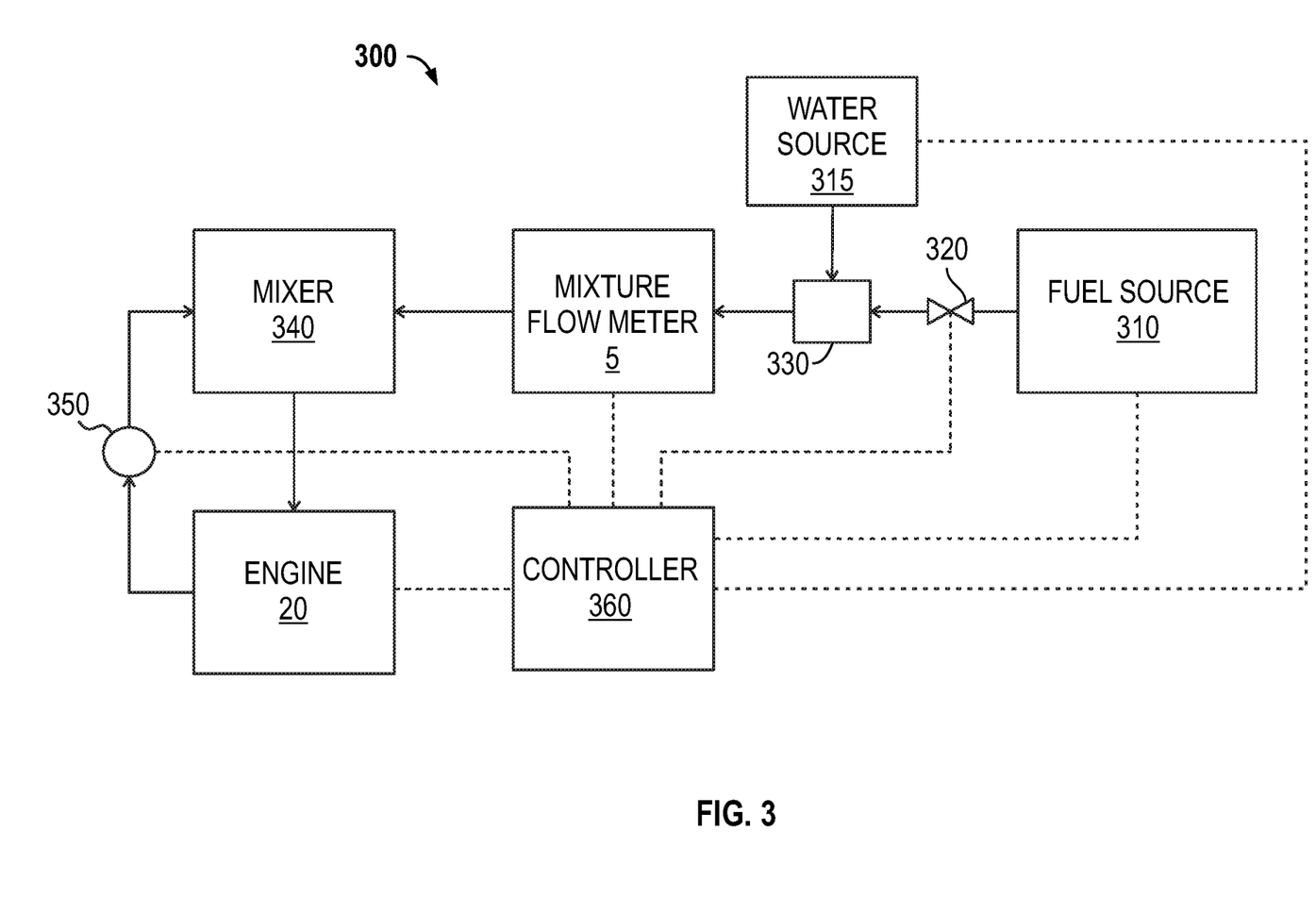
FIG. 3 shows another fuel control system 300 for fuel consumption calculation of a fuel and water mixture.

FIG. 3 shows another fuel control system 300 for fuel consumption calculation for a fuel and water mixture. As shown in FIG. 3, the fuel control system 300 is comprised of a fuel source 310 fluidly coupled to a valve 320. The valve 320 is fluidly coupled to a first mixer 330, which is configured to receive fuel supplied via the valve 320. The first mixer 330 is fluidly coupled to a water source 315 and is configured to receive water provided by the water source 315. The first mixer 330 is fluidly coupled to the mixture flow meter 5 shown in FIG. 3, and is configured to supply the fuel/water mixture to the mixture flow meter 5. The mixture flow meter 5 is configured to receive and measure properties of the supplied fuel/water mixture. The mixture flow meter 5 is fluidly coupled to a second mixer 340. The second mixer 340 is also fluidly coupled to the engine 20 and a re-circulator 350. The second mixer 340 and re-circulator 350 are fluidly coupled to the engine 20. The second mixer 340 is configured to receive and mix the supplied fuel/water mixture provided by the mixture flow meter 5 and re-circulated fuel/water mixture from the re-circulator 350 into a re-mixed fuel/water mixture. The second mixer 340 provides the re-mixed fuel/water mixture to the engine 20. The mixture flow meter 5, engine 20, fuel source 310, water source 315, valve 320, and re-circulator 350 are communicatively coupled to a controller 360.

The fuel and water source 310, 315 may be comprised of or include the water source flow meter 5$w$ and the fuel source flow meter 5$f$. For example, the fuel and water source 310, 315 may include a tank that is fluidly coupled to inlets on the water source flow meter 5$w$ and the fuel source flow meter 5$f$. Accordingly, the water source flow meter 5$w$ and the fuel source flow meter 5$f$ are communicatively coupled to the controller 360. The water source flow meter 5$w$ and the fuel source flow meter 5$f$ also provide fuel and water to the first mixer 330. The mixture flow meter 5 may be a simplified representation of the inlet and return flow meters 5$i$, 5$r$. The mixture flow meter 5 can measure the consumption of the fuel/water mixture by the engine 20.

The first and second mixer 330, 340 may be tanks configured to hold and mix the fuel/water mixture into a homogenous mixture. The first and second mixer 330, 340 may rely on various mechanisms to homogenize the fuel. For example, the first and second mixer 330, 340 may employ, for example, environmental vibrations, agitators, or the like, to homogenize the fuel. However, any suitable configuration may be employed in alternative embodiments. By being homogenized, the fuel/water mixture is uniformly comprised of the received fuel and water. As can be appreciated, although homogenous, the concentrations of the fuel and water may vary over time.

The re-circulator 350 may be configured to condition the fuel/water mixture re-circulated by the engine 20 for consumption by the engine 20. The re-circulator 350 may be comprised of a pressure controller, temperature controller, or the like, although any suitable configuration may be employed. Conditioning the fuel/water mixture re-circulated by the engine 20 may include the controller 360 controlling the pressure, temperature, etc., such that the re-circulated fuel/water mixture is suitable for use by the engine 20. However, in alternative embodiments, the fuel/water mixture reconditioning may include utilizing components that are not controlled by the controller 360.

The controller 360 may be a circuit board that includes a processor communicatively coupled to a memory and I/O ports, although any suitable controller may be employed in alternative embodiments. The controller 360 may include software that executes methods, such as the methods described herein, to control the flow of the fuel/water mixture through the fuel control system 300 shown in FIG. 3. The software may be stored in the memory and executed by the processor in the controller 360. Although the controller 360 is described as being a single circuit board, in alternative embodiments, other controllers may be comprised of two or more boards, such as sub-boards, modules, or the like.

Although not shown in FIG. 3, the fuel control system 300 may be comprised of additional components, such as temperature or pressure sensors, flow control valves, pressure regulators, or the like. Alternatively, other embodiments may not employ all of the components shown in FIG. 3. For example, the other embodiments may not employ the first and second mixer 330, 340, re-circulator 350, etc. Additionally or alternatively, the components shown in FIG. 3 may have other configurations. For example, the first and second mixer 330, 340 may include sensors and/or actuators that are controlled by the controller 360 to mix the fuel/water mixture received by the first and second mixer 330, 340.

As shown, the controller 360 may be configured to communicate with the mixture flow meter 5, engine 20, fuel source 310, water source 315, valve 320, and re-circulator 350 using the I/O ports. The I/O ports may be configured to communicate using any appropriate communication means, such as, for example, serial, parallel, packet-based, etc. The controller 360 may receive, for example, flow rate measurements from the fuel source 310, water source 315, mixture flow meter 5, fuel consumption data from the engine 20, valve position information from the valve 320, and fuel/water mixture re-circulation data from the re-circulator 350 via the I/O ports. The controller 360 may also send commands, such as valve open/close commands, to the valve 320 and fuel conditioning commands to the re-circulator 350.

The processor in the controller 360 may use the received flow rate data to calculate a flow rate of the fuel/water mixture flowing through the mixture flow meter 5. The processor in the controller 360 may be also configured to determine a fuel/water mixture consumption rate using flow rate of the fuel/water mixture provided by the mixture flow meter 5. The processor in the controller 360 may also send commands to open and close the valve 320 over the I/O ports. The controller 360 may also include a timer used by the processor to determine the time that the commands are sent to the valve 320. As will be explained in more detail in the following, the controller 360 can calculate a fuel consumption of the fuel/water mixture.

The calorific content for fuel (without water content) is used within the ISO-SFOC calculation, seen below in equation (1) as $Q_{TEST}$:

$$SFOC = \left[\frac{\alpha}{K} * Be * \frac{Q_{TEST}}{Q_{CONT}}\right] - EDP, \quad (1)$$

where:
SFOC=specific fuel oil consumption (g/kWh);
$Q_{TEST}$=net calorific value of the fuel oil during test (MJ/kg);
$Q_{CONT}$=net calorific value of the fuel oil during the engine's baseline characterization (MJ/kg), which may be referred to as factory acceptance test;
α=power adjustment factor;
K=ratio of indicated power;
Be=fuel oil consumption on test bed (g/kWh); and
EDP=Engine driven pumps (g/kWh).

Although the term "SFOC" is employed, alternative terms, such as, for example, BISO can also be employed which also refers to the fuel oil consumption according to ISO 3046-1.

When the fuel/water mixture is supplied to the mixture flow meter 5, an updated fuel/water mixture calorific content value is calculated, seen below in equation (2):

$$Q_{NEW} = (Q_{FUEL} * m_{FUEL}) + (Q_{WATER} * m_{WATER}) \quad (2)$$

where:
$Q_{NEW}$=calorific content of the fuel/water mixture;
$Q_{FUEL}$=calorific content value of fuel oil;
$Q_{WATER}$=calorific content value of water;
$m_{FUEL}$=mass flow concentration factor of fuel; and
$m_{WATER}$=mass flow concentration factor of water.

The mass flow concentration factors, $m_{FUEL}$ and $m_{WATER}$, are calculated below in equation (3) and equation (4) respectively:

$$m_{FUEL} = \frac{m_{FLOW\ FUEL}}{m_{FLOW\ TOTAL}}, \text{ and} \quad (3)$$

$$m_{WATER} = \frac{m_{FLOW\ WATER}}{m_{FLOW\ TOTAL}}, \quad (4)$$

where:
$m_{FLOW\ FUEL}$=mass flow of fuel;
$m_{FLOW\ WATER}$=mass flow of water; and
$m_{FLOW\ TOTAL}$=mass flow of the fuel/water mixture.

The mass flow of the fuel, water, and fuel/water mixture are measured by the water and fuel source flow meters 5w, 5f and mixture flow meter 5 described with reference to FIG. 3. The water and fuel source flow meters 5w, 5f and the mixture flow meter 5 can provide the measured mass flows to the controller 360, which can calculate the mass flow concentration factors using equations (3) and (4), the calorific content of the fuel/water mixture $Q_{NEW}$ using equation (2), and the SFOC for the fuel/water mixture. When calculating the SFOC for the fuel/water mixture, the calorific content of the fuel/water mixture $Q_{NEW}$ is used in place of $Q_{TEST}$ as shown in following equation (5):

$$SFOC_{CORR} = \left[\frac{\alpha}{K} * Be * \frac{Q_{NEW}}{Q_{CONT}}\right] - EDP, \quad (5)$$

where:
$SFOC_{CORR}$=specific fuel oil consumption (g/kWh), corrected for the fuel/water mixture.

Accordingly, the corrected specific fuel oil consumption $SFOC_{CORR}$ includes the calorific content of water even though the baseline or factory acceptance test SFOC only used the calorific content of the fuel oil $Q_{CONT}$.

Other methods may be used to correct the SFOC. For example, an alternative method for correcting the SFOC for mixture is by correcting the 'fuel mass consumed' value and leaving the 'fuel calorific content' value uncorrected. The 'fuel mass consumed' value is corrected by using only the fuel added to the fuel mixture, instead of using the total fluid burned measurement. Alternatively, the flow measurements by the water and fuel source flow meters 5w, 5f and mixture flow meter 5 may be volume flow measurements. Accordingly, the fuel consumption calculation may be based on volume rather than mass. The following illustrates a method that calculates a fuel consumption of a fuel/water mixture.

Method

Figure 4:
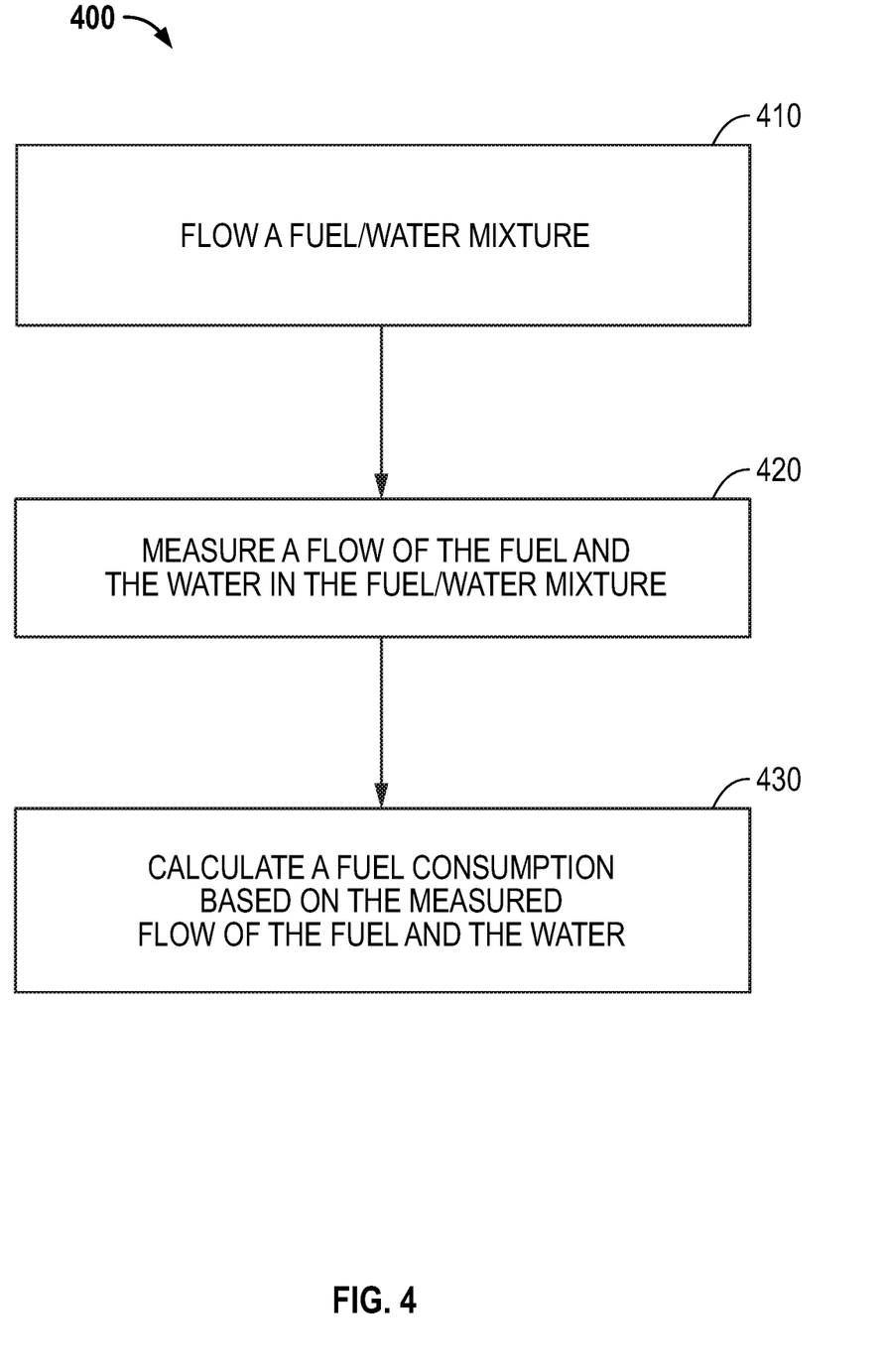
FIG. 4 shows a method 400 for fuel consumption calculation of a fuel and water mixture.

FIG. 4 shows a method 400 for fuel consumption calculation of a fuel and water mixture. The method 400 begins by flowing a fuel/water mixture in step 410. The fuel/water mixture may be a mixture of fuel oil provided by the fuel source 310 and water provided by the water source 315, although any suitable fuel/water mixture may be employed. The fuel/water mixture may be mixed in the first mixer 330 and provided to the mixture flow meter 5. The concentrations of the fuel and water can vary over time by, for example, controlling the flow rate of the fuel or the water.

In step 420, the method 400 measures a flow of the fuel and the water in the fuel/water mixture. Due to the concentrations of the fuel and water varying, the measured mass flow of the fuel and/or water may vary. The flow of the water and fuel can be measured by the water and fuel source flow meters 5w, 5f. The water and fuel source flow meters 5w, 5f can provide the measured flow of the fuel and water to the controller 360. Similarly the flow of the fuel/water mixture can be measured by the mixture flow meter 5 and provided to the controller 360.

In step 430, the method 400 calculates fuel consumption based on the measured flow of the fuel and the water. The calculated fuel consumption can be the corrected specific fuel oil consumption $SFOC_{CORR}$ calculated using equation (5), although any suitable fuel consumption calculation may be employed. With reference to equations (2)-(5), the net calorific content of the fuel/water mixture $Q_{NEW}$ can be calculated based on the mass flows of the fuel and the water $m_{FLOW\ FUEL}$, $m_{FLOW\ WATER}$. The corrected specific fuel oil consumption $SFOC_{CORR}$ can be calculated based on the net calorific content of the fuel/water mixture.

The fuel consumption can be calculated continuously. For example, the controller 360 can continuously receive mass flow $m_{FLOW\ FUEL}$, $m_{FLOW\ WATER}$ measurements from the water and fuel source flow meters 5w, 5f and the total mass flow $m_{FLOW\ TOTAL}$ from the mixture flow meter 5 to continuously and iteratively calculate the corrected specific fuel oil consumption $SFOC_{CORR}$. Additionally or alternatively, a time delay between the mass flow $m_{FLOW\ FUEL}$, $m_{FLOW\ WATER}$, $m_{FLOW\ TOTAL}$ measurements and the consumption of the corresponding fuel/water mixture may be included. For example, the corrected specific fuel oil consumption $SFOC_{CORR}$ may be calculated with measurement data that are offset by a delay to ensure that the ratio of indicated power K and engine driven pumps EDP, as well as any other correction factors that vary over time, correspond to the fuel/water mixture actually being consumed by the engine 20. The delay may be a fixed value or may be correlated to the mass flow $m_{FLOW\ TOTAL}$ of the fuel/water mixture.

As explained above, the fuel control system 300 and the method 400 calculate the fuel consumption of the fuel and water mixture. The fuel consumption may be calculated based on the mass flow of the fuel and the mass flow of the water, which may be measured by the water and fuel source flow meters 5w, 5f. The controller 360 can calculate the fuel consumption using calorific contents of both the fuel and water in the fuel/water mixture. The calorific content of the fuel/water mixture can be based on the mass concentrations of the fuel and the water in the fuel/water mixture. For example, the corrected specific fuel oil consumption $SFOC_{CORR}$ can be calculated with a corrected calorific content of the fuel/water mixture $Q_{NEW}$, thereby correcting for the calorific content of the water in the fuel/water mixture.

As a result, the engine's 20 specific fuel oil consumption SFOC can be calculated to an ISO standard (e.g., ISO 3046-1) and compared to its Factory Acceptance Test SFOC in order to determine the current lifecycle usage of the engine, even though the engine 20 is consuming the fuel/water mixture. This ISO standard comparison can also be used to prove the effectiveness of preventative maintenance/service programs sold by the engine 20 manufacturer. The effectiveness of the preventive maintenance/service programs can be more accurately evaluated with the corrected specific fuel oil consumption $SFOC_{CORR}$ than if the uncorrected specific fuel oil consumption SFOC calculation is used.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other fuel consumption calculations of a fuel and water mixture and not just to the embodiments described above and shown in the accompanying figures. Accordingly, the scope of the embodiments described above should be determined from the following claims.

We claim:

1. A fuel control system (300) for fuel consumption calculation for a fuel and water mixture, the fuel control system (300) comprising:
   a mixer (330);
   a fuel source (310) fluidly coupled to the mixer (330), the fuel source (310) being configured to measure a flow of fuel to the mixer (330);
   a water source (315) fluidly coupled to the mixer (330), the water source (315) being configured to measure a flow of water to the mixer (330);
   a mixture flow meter (5) fluidly coupled to the mixer (330), the mixture flow meter (5) being configured to receive and measure properties of a fuel/water mixture from the mixer (330); and
   a controller (360) communicatively coupled to the fuel source (310), the water source (315), and the mixture flow meter (5), said controller (360) being configured to calculate a fuel consumption based on the measured flow of the fuel, the measured flow of the water, and the measured flow of the fuel/water mixture provided by the mixture flow meter (5);
   wherein the controller (360) being configured to calculate the fuel consumption based on the measured flow of the fuel, the measured flow of the water, and the measured flow of the fuel/water mixture comprises the controller (360) being configured to calculate the fuel consumption based on equation:

$$SFOC = \left[\frac{\alpha}{K} * Be * \frac{Q_{TEST}}{Q_{CONT}}\right] - EDP,$$

where:
   SFOC=specific fuel oil consumption (g/kWh);
   $O_{TEST}$=net calorific value of the fuel oil during test (MJ/kg);
   $O_{CONT}$=net calorific value of the fuel oil during the engine's baseline characterization (MJ/kg), which may be referred to as factory acceptance test;
   α=power adjustment factor;
   K=ratio of indicated power;
   Be=fuel oil consumption on test bed (g/kWh); and
   EDP=Engine driven pumps (g/kWh).

2. The fuel control system (300) of claim 1, wherein the net calorific content of the fuel during test ($Q_{TEST}$) is updated using the following equation:

$$Q_{NEW}=(Q_{FUEL}*m_{FUEL})+(Q_{WATER}*m_{WATER});$$

where:
$Q_{NEW}$=calorific content of the fuel/water mixture;
$Q_{FUEL}$=calorific content value of fuel oil;
$Q_{WATER}$=calorific content value of water;
$m_{FUEL}$=mass flow concentration factor of fuel; and
$m_{WATER}$=mass flow concentration factor of water.

3. The fuel control system (300) of claim 1, wherein the controller (360) being configured to calculate a fuel consumption based on the measured flow of the fuel, the measured flow of the water, and the measured flow of the fuel/water mixture comprises the controller (360) being configured to calculate a mass flow concentration factor of the fuel ($m_{FUEL}$) and a mass flow concentration factor of the water ($m_{WATER}$) based on the measured flow of the fuel, the measured flow of the water, and the measured flow of the fuel/water mixture provided by the mixture flow meter (5).

4. The fuel control system (300) of claim 1, wherein the water source (315) comprises a water source flow meter (5w) and the fuel source (310) comprises a fuel source flow meter (5f).

5. The fuel control system (300) of claim 1, wherein the water source (315) being configured to measure the flow of water comprises the water source (315) being configured to measure a mass flow of the water ($m_{FLOW\ WATER}$) and the fuel source (310) being configured to measure the flow of the fuel comprises the fuel source (310) being configured to measure a mass flow of fuel ($m_{FLOW\ FUEL}$).

6. The fuel control system (300) of claim 1, wherein the mixture flow meter (5) being configured to receive and measure properties of a fuel/water mixture from the mixer (330) comprises the mixture flow meter (5) being configured to measure a mass flow of the fuel/water mixture ($m_{FLOW\ TOTAL}$).

7. The fuel control system (300) of claim 1, wherein the measured flow of the fuel and the measured flow of the water are volume flow rates, and wherein the fuel source (310) is further configured to measure a density of the flow of the fuel, the water source (315) is further configured to measure a density of the flow of the water, and the properties of the fuel/water mixture comprise at least one of a volume flow rate and a density of the fuel/water mixture.

8. A method of calculating a fuel consumption of a fuel and water mixture, the method comprising:
flowing a fuel/water mixture;
measuring a flow of the fuel/water mixture;
measuring a flow of the fuel and a flow of the water in the fuel/water mixture; and
calculating a fuel consumption based on the measured flow of the fuel, the measured flow of the water, and the measured flow of the fuel/water mixtures;

wherein calculating the fuel consumption based on the measured flow of the fuel and the water comprises calculating the fuel consumption based on equation:

$$SFOC = \left[\frac{\alpha}{K} * Be * \frac{Q_{TEST}}{Q_{CONT}}\right] - EDP,$$

where:
SFOC=specific fuel oil consumption (g/kWh);
$O_{TEST}$=net calorific value of the fuel oil during test (MJ/kg);
$O_{CONT}$=net calorific value of the fuel oil during the engine's baseline characterization (MJ/kg), which may be referred to as factory acceptance test;
$\alpha$=power adjustment factor;
K=ratio of indicated power;
Be=fuel oil consumption on test bed (g/kWh); and
EDP=Engine driven pumps (g/kWh).

9. The method of claim 8, wherein the net calorific content of the fuel during test ($Q_{TEST}$) is updated using the following equation:

$$Q_{NEW}=(Q_{FUEL}*m_{FUEL})+(Q_{WATER}*m_{WATER});$$

where:
$Q_{NEW}$=calorific content of the fuel/water mixture;
$Q_{FUEL}$=calorific content value of fuel oil;
$Q_{WATER}$=calorific content value of water;
$m_{FUEL}$=mass flow concentration factor of fuel; and
$m_{WATER}$=mass flow concentration factor of water.

10. The method of claim 8, wherein calculating a fuel consumption based on the measured flow of the fuel and the water comprises calculating a mass flow concentration factor of the fuel ($m_{FUEL}$) and a mass flow concentration factor of the water ($m_{WATER}$) based on the measured flow of the fuel and the water, and the measured flow of the fuel/water mixture.

11. The method of claim 8, wherein measuring the flow of the fuel and the water comprises measuring a mass flow of the water ($m_{FLOW\ WATER}$) and measuring a mass flow of fuel ($m_{FLOW\ FUEL}$).

12. The method of claim 8, wherein measuring the flow rate of the fuel and the water comprises measuring a mass flow of the fuel/water mixture ($m_{FLOW\ TOTAL}$).

13. The method of claim 8, wherein the measured flow of the fuel and the measured flow of the water are volume flow rates, and wherein the method further comprises measuring a density of at least one of the flow of the fuel and the flow of the water.

* * * * *

UNITED STATES PATENT AND TRADEMARK OFFICE
CERTIFICATE OF CORRECTION

PATENT NO. : 11,441,496 B2
APPLICATION NO. : 16/303046
DATED : September 13, 2022
INVENTOR(S) : Christopher Douglas Hill, Patrick John Zimmer and Taylor Robert Scott It is certified that error appears in the above-identified patent and that said Letters Patent is hereby corrected as shown below:

In the Specification

Column 2, Line 40, the equation should appear as follows:
$Q_{NEW} = (Q_{FUEL} * m_{FUEL}) + (Q_{WATER} * m_{WATER});$ Column 3, Line 38, the equation should appear as follows:
$Q_{NEW} = (Q_{FUEL} * m_{FUEL}) + (Q_{WATER} * m_{WATER});$ Signed and Sealed this
Twenty-sixth Day of March, 2024

Katherine Kelly Vidal
*Director of the United States Patent and Trademark Office*